United States Patent [19]

Kosik et al.

[11] Patent Number: 6,090,009
[45] Date of Patent: Jul. 18, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/269,281

[22] PCT Filed: Aug. 9, 1997

[86] PCT No.: PCT/DE97/01701

§ 371 Date: Mar. 25, 1999

§ 102(e) Date: Mar. 25, 1999

[87] PCT Pub. No.: WO98/13628

PCT Pub. Date: Apr. 2, 1998

[30] Foreign Application Priority Data

Sep. 25, 1996 [DE] Germany ............... 196 39 200

[51] Int. Cl.[7] .................................................. B60K 41/22
[52] U.S. Cl. .................. 477/87; 192/3.62; 192/30 W
[58] Field of Search ........................ 192/90, 30 W, 192/3.62; 340/456; 477/87, 79; 74/DIG. 7, 335

[56] References Cited

U.S. PATENT DOCUMENTS

| | | | |
|---|---|---|---|
| 4,631,679 | 12/1986 | Klatt | 477/121 X |
| 4,930,081 | 5/1990 | Dunkley et al. | 477/78 X |
| 5,050,079 | 9/1991 | Steeby | 74/335 X |
| 5,053,959 | 10/1991 | Genise | 74/335 X |
| 5,165,307 | 11/1992 | Goeckner et al. | 477/148 |
| 5,377,797 | 1/1995 | Mustapha et al. | |
| 5,444,623 | 8/1995 | Genise | 74/335 X |
| 5,741,202 | 4/1998 | Huber | 477/110 X |
| 5,904,068 | 5/1999 | Genise | 74/335 |
| 5,916,291 | 6/1999 | McKee | 192/3.62 X |

FOREIGN PATENT DOCUMENTS

| | | |
|---|---|---|
| 0 404 354 | 12/1990 | European Pat. Off. |
| 89 13 910 U | 2/1991 | Germany |

*Primary Examiner*—Rodney H. Bonck
*Attorney, Agent, or Firm*—Evenson, McKeown, Edwards & Lenahan, PLLC

[57] ABSTRACT

Disclosed is an automatic clutch for an engine-transmission unit in a vehicle with random gear changing. A sensor technology is used for determining the parameters to be taken into account for the automated clutch control. The sensing device includes a speed or driving notch display, so that, when normally changing the gear or driving notch, the transition over the neutral gear or idle is not displayed.

10 Claims, 1 Drawing Sheet

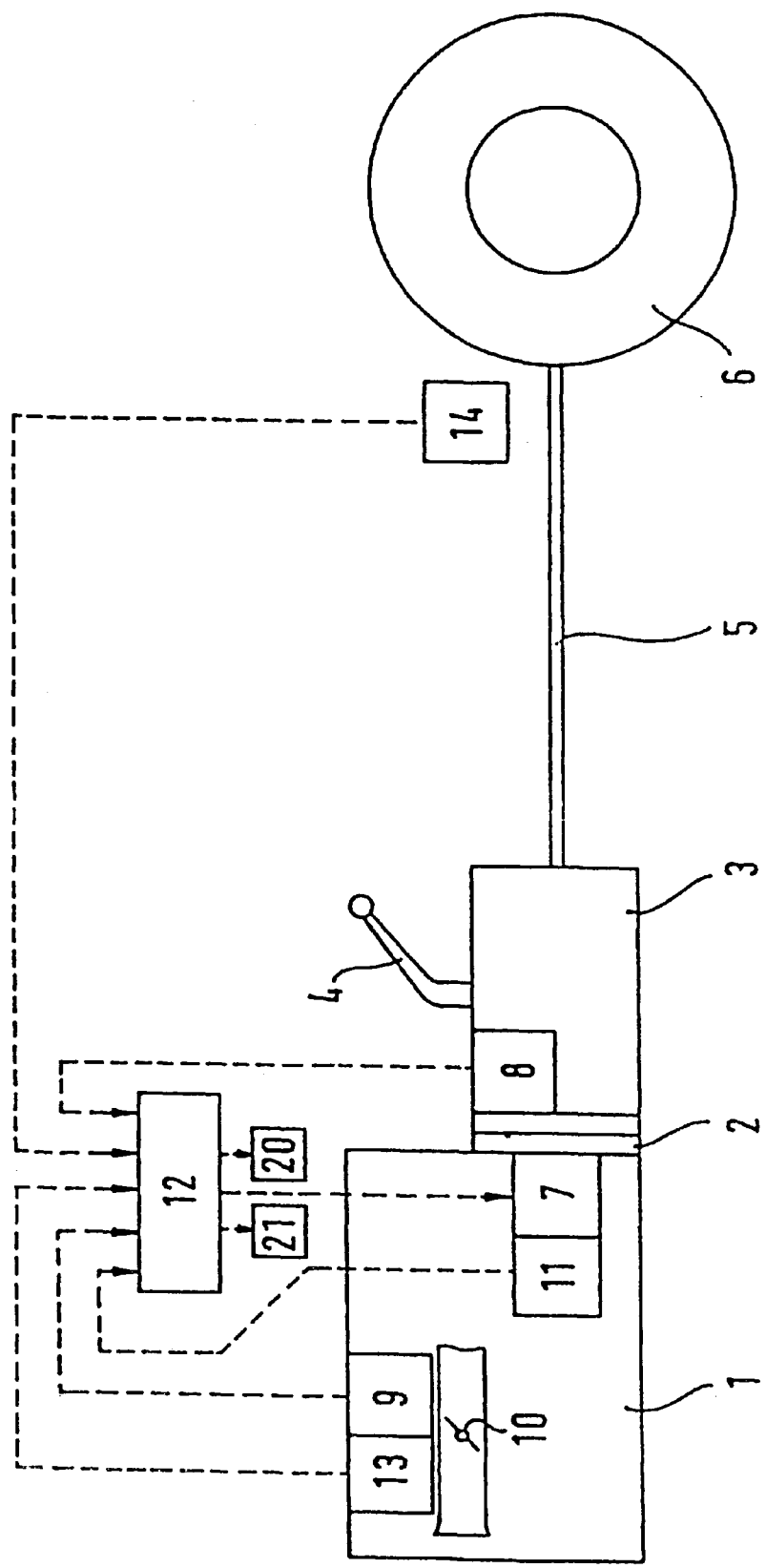

AUTOMATIC CLUTCH

BACKGROUND AND SUMMARY OF THE INVENTION

The invention concerns an automatic clutch in the drive train of a motor vehicle, having a transmission which can be manually or arbitrarily shifted between gears or drive positions with different transmission ratios and passes through a neutral or idling position during a gear change or change of drive position. A motorized adjusting unit, which is controlled by a system of sensors, actuates the clutch and releases the clutch when the system of sensors detects that the respectively previously selected drive position or the previously selected gear is being left.

Vehicles with customary internal combustion engines require a drive train with a transmission in order to be able to adapt the transmission ratio between the engine speed and the speed of the drive wheels of the vehicle to different conditions. In the case of customary manually shifted transmissions, the shifting element or the shift lever in each case passes through a neutral or idling region when changing gears or drive positions.

During the changing of gears or drive positions in the case of customary transmissions the clutch must be released.

In addition to clutches operated by the driver by use of a pedal or the like, automatically actuated clutches are also known in principle and used as standard.

U.S. Pat. No. 5,377,797 shows, by way of example, a clutch of the above-mentioned type. The clutch is engaged and released when the shift lever of the transmission sufficiently approaches a position assigned to a drive position and, respectively, is moved sufficiently away from this position.

Moreover, in the case of automatic clutches there is also a desire for a system of sensors which senses various parameters. In particular, the system of sensors can register which drive position or which gear has been selected. This is important and advantageous because the clutch is to be released as quickly as possible when shifting is intended by the driver, i.e. whenever a previously selected gear or a previously selected drive position is being left, in order to avoid major wear to the clutch and/or damage to the transmission.

It has already been attempted to use the signals for the respectively selected gear or the respectively selected drive position sensed by the system of sensors also for controlling a gear or drive-position indication.

German Patent document DE-U 89 13 910 concerns a drive-position indication.

The object of the invention is thus to present advantageous arrangements for automatic clutches.

This object is achieved according to the invention by providing an indication for the respectively selected gear or the respectively selected transmission stage as well as the neutral or idling position. According to the invention, it is possible to suppress the indication for the neutral or idling position during a change of gears or drive positions.

The invention is based on the general idea of not indicating the passing through of the neutral or idling position as long as the intention of the driver to carry out a change of gears or drive positions is evident or very probable on the basis of the parameters sensed by the system of sensors. This offers the advantage that the driver cannot be irritated when changing gears or drive positions by indicating signals which merely are assigned to a state of the transmission necessarily passed through in a temporary fashion, that are of no significance for the shifting intended by the driver and that are not desired by the driver as a final state.

According to a preferred embodiment of the invention, it may be envisaged to make the indication of the neutral or idling state possible only after a delay time, the length of which is set to correspond to the typical time interval of a gear change or change of drive position. This makes it possible in a way which is simple in design terms—for example by a delay circuit—that during a customary gear change or change of drive position the neutral or idling state necessarily passed through during such a change is not indicated. On the other hand, an indication of this state remains possible whenever the driver actually selects the idling or neutral state.

According to a further particularly preferred embodiment, it may be envisaged to sense the speed of movement with which the driver actuates the corresponding control element, generally a shift lever, during the gear change or change of drive position.

The sensing of this parameter is provided in an advantageous way for controlling the clutch. This is because the speed of movement is an indication of whether the driver prefers a more sporty style of driving or a style of driving based more on comfort, since sporty drivers will generally carry out the gear change or change of drive position very rapidly, while this change takes place comparatively slowly if the greatest possible driving comfort is desired. Consequently, when sensing the speed of the gear change or change of drive position, control of the clutch can also be adapted to the respective driving style, in that the slipping phase during engagement of the clutch is shortened, for example, in the case of a sporty driving style and is lengthened in the case of a driving style conscious of comfort.

Thus, according to the invention the signal for the speed of movement of the control element or shift lever of the transmission can also be utilized in the suppression or execution of the indication of the idling or neutral state. If the idling or neutral state is passed through at a certain minimum speed, this represents a reliable indication of the intention of the driver to change the gears or drive positions. In this case, the indication of the neutral or idling state does not occur. With a diminishing speed of the movement of the control element or shift lever of the transmission in the region of the idling or neutral position, on the other hand, it must be expected that the driver actually intends to select the neutral or idling state. In this case, this state is immediately indicated.

Otherwise, with regard to preferred features of the invention, reference is made to the claims and the following explanation of the drawing, on the basis of which particularly advantageous embodiments are described.

BRIEF DESCRIPTION OF THE DRAWING

In the drawing, the single Figure shows a schematic representation of a drive train of a motor vehicle as well as the components essential for the clutch control.

DETAILED DESCRIPTION OF THE DRAWING

According to the drawing, an internal combustion engine 1 is connected in drive terms via an automatically actuated clutch 2 and a transmission 3. The drive positions or gears of the transmission are changed by manual actuation of a shift lever 4. The transmission is coupled with a drive shaft 5, for example a cardan shaft, to drive wheels 6 of a motor vehicle, otherwise not represented in any more detail.

The actuation of the clutch 2 takes place automatically via a motorized adjusting unit 7. For controlling the adjusting unit 7, a system of sensors is provided for monitoring various parameters of driving operation.

This system of sensors comprises a sensor arrangement 8, which is assigned to the transmission 3 or the shift lever 4 and senses the positions and movements of the latter. Consequently, the system "knows" the respectively selected drive position or the respectively engaged gear and the speed of movement of the shift lever 4.

The position of an element serving for controlling the power of the engine 1, for example a throttle valve 10 of an air intake system of the engine 1, is registered by a sensor 9.

Furthermore, the system of sensors comprises a displacement pickup 11, which is assigned to the adjusting unit 7 and senses the position of the latter, and consequently a parameter which is analogous to the value of the moment which can be transmitted by the automatic clutch 2.

The control circuit 12 also communicates with an engine control 13, which has the task, among other things, of keeping the engine speed at a minimum speed, for instance the idling speed, to the greatest extent independently of the loading of the engine. This engine control 13 can generate signals which reproduce the respective speed of the engine 1 and/or the torque respectively generated by the engine 1.

The control circuit 12 otherwise communicates with speed pickups 14, which are assigned to the drive wheels 6.

On the basis of the exchange of information with the engine control 13, the control circuit 12 can determine the torque actually transmitted in each case by the clutch 2. At the same time, the control circuit 12 knows the position of the adjusting unit 7. In addition, the control circuit 12 can establish on the basis of the signals of the engine control 13, which also reproduces the speed of the engine, and the signals of the speed pickups 14 together with the signals of the sensor arrangement 8 for the selected gear or the drive position used (these signals show the transmission ratio) whether the clutch 2 is operating with slip, i.e. whether the speeds on the input side and the output side of the clutch deviate from one another. Should this be the case, the respective position of the adjusting unit 7 is assigned to the torque respectively transmitted by the clutch 2. This is because, if the clutch 2 is operating with slip, the moment actually transmitted by the clutch in each case corresponds to the transmissible moment in the assigned position of the adjusting unit 7. In this way, the control circuit 12 can constantly determine and store mutually assigned values between the travel of the adjusting unit 7 and the moment which can be transmitted by the clutch 2, and can extrapolate from this the moment which can be transmitted by the clutch 2 in other positions of the adjusting unit 7.

There is consequently the possibility when engaging the clutch 2, for instance after changing the gears or drive positions of the transmission 3, of controlling the initially occurring slipping phase of the clutch 2 sensitively as a function of predetermined parameters.

In the present case, the speed with which the shift lever 4 is moved during a change of gears or drive positions is also sensed by the sensor arrangement 8. In the case of a high speed of movement, as is typical for a "sporty" driving style, the slipping phase of the clutch 2 after a gear change or change of drive position can be shortened.

The shift pattern of the shift lever 4 is designed in principle in a conventional way, i.e. when changing gear or drive position the shift lever 4 in each case passes through a neutral or idling position, the transmission 3 not allowing a drive connection between the engine 1 and the drive wheels 6 in its idling or neutral state.

According to the invention, the signals of the sensor arrangement 8 are thus also used for controlling an indicator 20, which is able to indicate the respectively selected drive position or the respectively selected gear and also the idling or neutral position of the shift lever 4.

According to the invention, an indication of the neutral or idling position does not occur—at least generally—during a normal gear change or change of drive position. For this purpose, according to a preferred embodiment of the invention, the speed of movement of the shift lever 4 in the region of the neutral or idling position, sensed by the sensor arrangement 8, is evaluated. As long as the speed of movement lies above a low threshold value, an indication of the neutral or idling position does not occur, because it can be assumed with the greatest probability that the driver actually wishes to carry out a gear change or change of drive position. Only if the speed falls below said threshold value can indication of the neutral or idling position take place.

In addition or alternatively, it may be envisaged to make an indication of the neutral or idling position possible only after a certain time delay following the point in time at which the shift lever 4 leaves a position assigned to a drive position or a gear. If the delay time is adapted in a way according to the invention to a typical time interval for a gear change or change of drive position, an indication of the neutral or idling position of the shift lever 4 during a gear change or change of drive position is likewise avoided.

In the present invention, it is advantageous that only signals which are in any case registered for controlling the clutch 2 are required for controlling the indicator 20.

If appropriate, the signals of the engine control 13 may be used for controlling a further indicator 21, which indicates to the driver the optimum drive position or the optimum gear of the transmission 3 for the respective loading of the engine 1.

What is claimed is:

1. An automatic clutch in a drive train of a motor vehicle having a transmission which is manually and arbitrarily shifted, via a shift lever, between gears or drive positions with different transmission ratios wherein the shift lever passes through a neutral or idling position to effect a gear change or change of drive position, wherein the transmission is in the neutral or idling position when the shift lever is in the neutral or idling position, the clutch comprising:

a motorized adjusting unit which actuates the clutch and releases the clutch;

a system of sensors controlling the motorized adjusting unit, the system of sensors detecting that the respectively previously selected drive position or the respectively previously selected gear is being left; and an indicator for the respectively selected gear or the respectively selected transmission stage, as well as the neutral or idling position, the neutral or idling position indication being suppressed during a change of gears or drive positions by the shift lever.

2. The clutch as claimed in claim 1, wherein the indicator for the neutral or idling position is activatable only after a predeterminable delay time after leaving a drive position or gear.

3. The clutch as claimed in claim 2, comprising a further indicator which indicates a shift recommendation on the basis of signals emitted to it by an engine control.

4. The clutch as claimed in claim 1, comprising a further indicator which indicates a shift recommendation on the basis of signals emitted to it by an engine control.

5. An automatic clutch in a drive train of a motor vehicle having a transmission which is manually and arbitrarily shifted between gears or drive positions with different transmission ratios and passes through a neutral or idling position during a gear change or change of drive position, the clutch comprising:
- a motorized adjusting unit which actuates the clutch and releases the clutch;
- a system of sensors controlling the motorized adjusting unit, the system of sensors detecting that the respectively previously selected drive position or the respectively previously selected gear is being left;
- an indicator for the respectively selected gear or the respectively selected transmission stage, as well as the neutral or idling position, the neutral or idling position indication being suppressed during a change of gears or drive positions; and
- wherein a sensor arrangement for sensing an adjusting speed of a control element or shift lever for a gear change or change of drive position is provided, and the indicator for the neutral or idling position being activated only if the adjusting speed falls below a low threshold value.

6. The clutch as claimed in claim 5, comprising a further indicator which indicates a shift recommendation on the basis of signals emitted to it by an engine control.

7. An automatic clutch in a drive train of a motor vehicle having a transmission which is manually and arbitrarily shifted between gears or drive positions with different transmission ratios and passes through a neutral or idling position during a gear change or change of drive position, the clutch comprising:
- a motorized adjusting unit which actuates the clutch and releases the clutch;
- a system of sensors controlling the motorized adjusting unit, the system of sensors detecting that the respectively previously selected drive position or the respectively previously selected gear is being left;
- an indicator for the respectively selected gear or the respectively selected transmission stage, as well as the neutral or idling position, the neutral or idling position indication being suppressed during a change of gears or drive positions;
- wherein the indicator for the neutral or idling position is activatable only after a predeterminable delay time after leaving a drive position or gear; and
- wherein a sensor arrangement for sensing an adjusting speed of a control element or shift lever for a gear change or change of drive position is provided, and the indicator for the neutral or idling position being activated only if the adjusting speed falls below a low threshold value.

8. A gear indication system, comprising:
- a display for indicating a selected gear position, said display including an indicator for a neutral position of the gear;
- a vehicle transmission coupled with said display, said transmission being manually shiftable between gears so as to pass through the neutral position during a gear change;
- a shift lever coupled with the vehicle transmission, the shift lever passing through the neutral position to effect the gear change of the vehicle transmission, wherein the transmission is in neutral when the shift lever is in the neutral position;
- wherein the neutral position indicator on the display is suppressed during the gear change by the shift lever from one non-neutral gear to another.

9. A method of controlling a gear indicator for a vehicle transmission having an automatic clutch, the transmission being manually and arbitrarily shifted, via a shift lever, between gears with different transmission ratios such that a neutral position of the shift lever is passed through during a gear change, the neutral position corresponding to a neutral condition of the transmission, the method comprising the acts of:
- indicating a respectively selected gear position on a display; and
- suppressing a neutral position indication on the display when the shift lever effects a gear change from one non-neutral gear to another.

10. The method according to claim 9, further comprising the act of activating the neutral position indication after a predeterminable delay time after leaving a previous gear.

* * * * *